3 Sheets—Sheet 2.

J. SKEEN.
DUMPING WAGON.

No. 115,244.  Patented May 23, 1871.

Witnesses.  Inventor.

3 Sheets—Sheet 3.

J. SKEEN.
DUMPING WAGON.

No. 115,244.                     Patented May 23, 1871.

Witnesses.                                  Inventor
                                            Jacob Skeen
                                            Attys.

THE NORRIS PETERS CO., PHOTO-LITHO., WASHINGTON, D. C.

United States Patent Office.

JACOB SKEEN, OF MOUND CITY, ILLINOIS.

Letters Patent No. 115,244, dated May 23, 1871.

IMPROVEMENT IN DUMPING-WAGONS.

The Schedule referred to in these Letters Patent and making part of the same.

*To all whom it may concern:*

Be it known that I, JACOB SKEEN, of Mound City, in the county of Pulaski and in the State of Illinois, have invented certain new and useful Improvements in Dumping-Wagons; and do hereby declare that the following is a full, clear, and exact description thereof, reference being had to the accompanying drawing making a part of this specification, in which—

Figure 1:
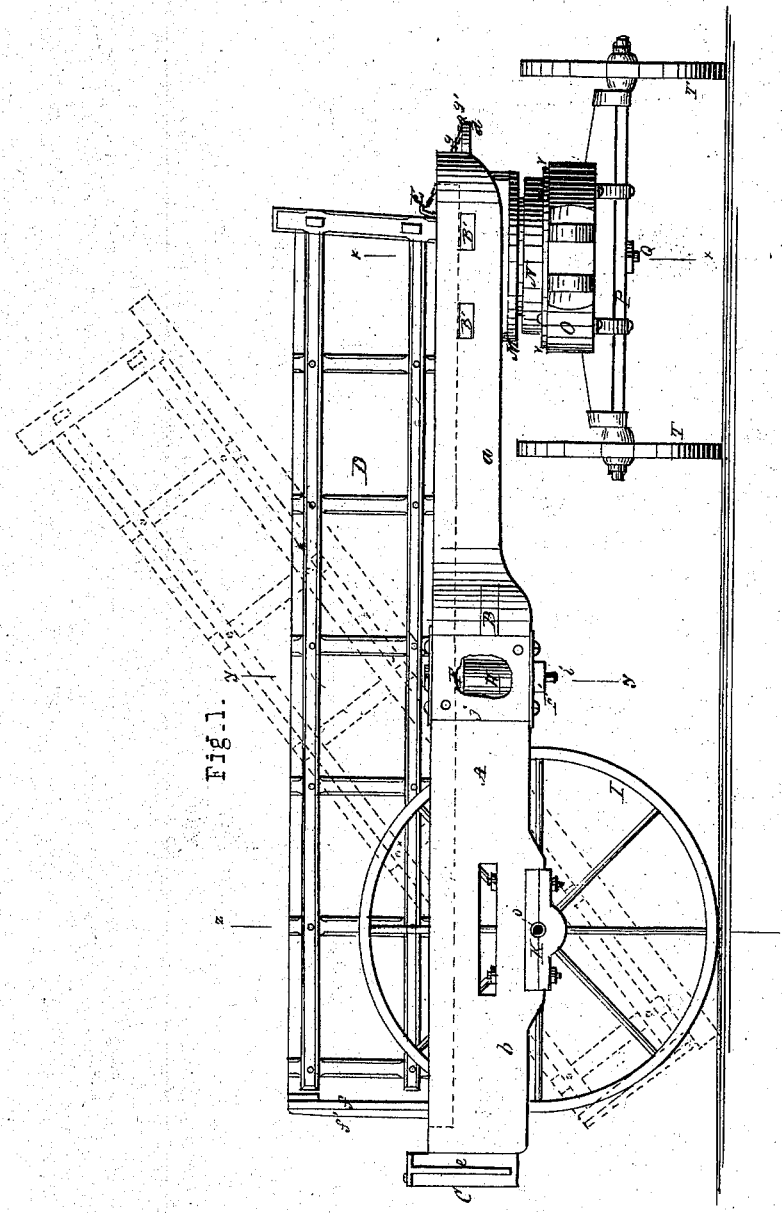
Figure 2:
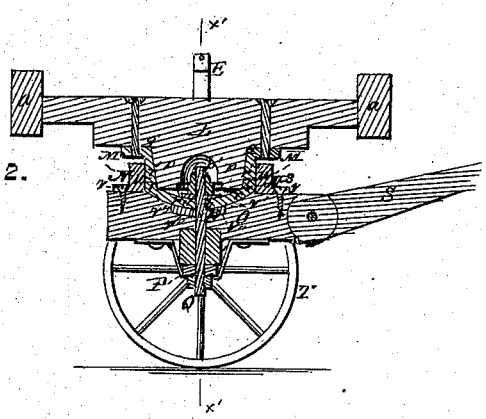
Figure 3:
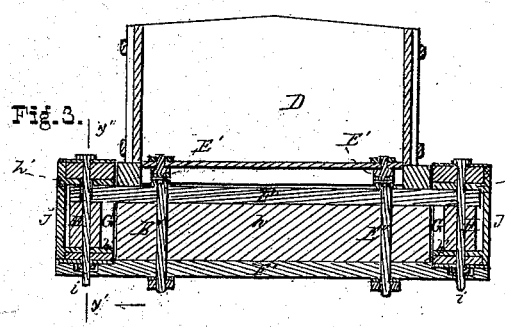
Figure 4:
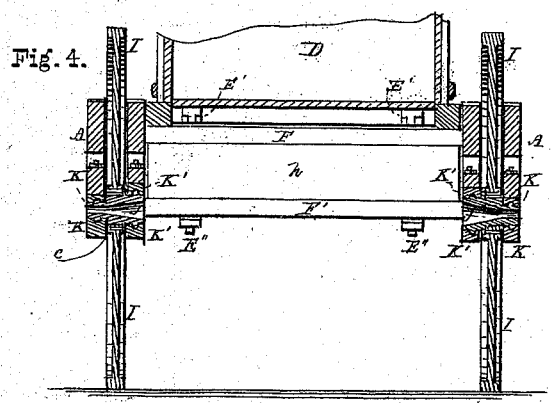
Figure 5:
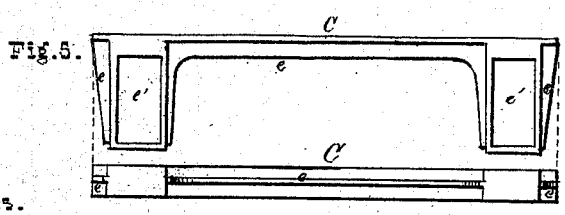
Figure 6:
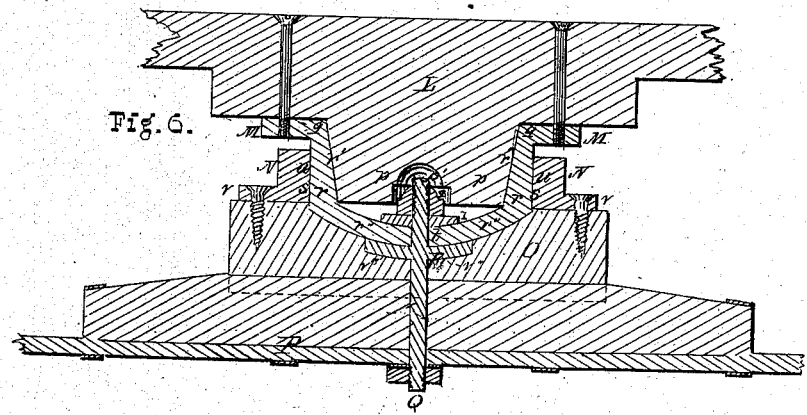
Figure 7:
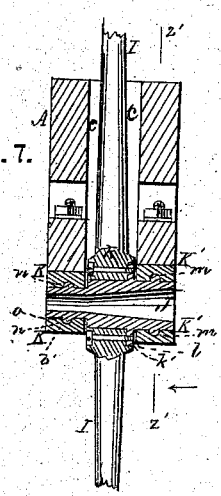
Figure 8:
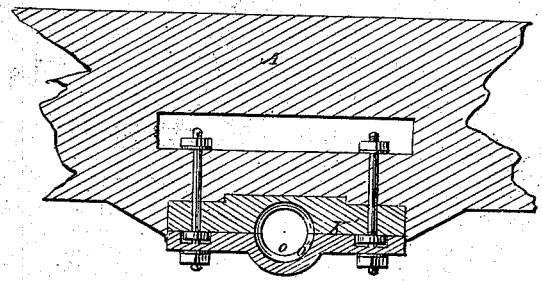

Figure 1 is a side elevation of the entire wagon, with the forward wheels turned so as to give a front presentation, and the body shown in dotted lines as in position for dumping;

Figure 2, a vertical cross-section on the line $x\ x$ of fig. 1;

Figure 3, a similar section on the line $y\ y$ of the same figure;

Figure 4, a similar section on the line $z\ z$ of the same figure;

Figure 5, a rear-end view of the yoke-bar on the wagon, and a view of the same from beneath;

Figure 6, a vertical cross-section on the line $x'\ x'$ of fig. 2;

Figure 7, an enlarged view of the vertical cross-section of a portion of the wheel, its bearings and attachments, shown in fig. 4, the upper and lower portions of the wheel being broken away;

Figure 8, a vertical cross-section on the line $z'\ z'$ of fig. 7; and

Figure 9:
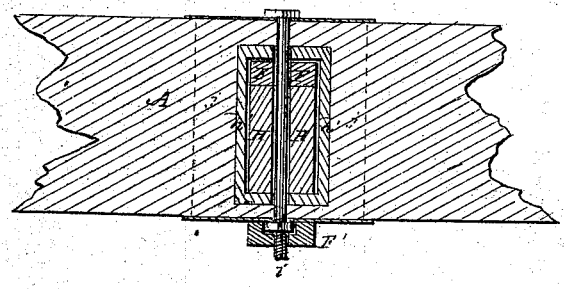

Figure 9, a vertical cross-section on the line $y'\ y'$ of fig. 3.

Letters and figures of like name and kind refer to like parts in each of the figures.

The object I have in view is the construction of a dumping-wagon, to be used particularly in the carriage of bricks and coals, which shall be cheap, strong, and light, which shall be convenient in operation and durable in wear, easily kept in order, and as easily repaired; and My invention therein consists in the construction and arrangement of the frame by means of which the axle to the hind wheels may be dispensed with; in the means employed by which the body rests upon springs at the point where it is pivoted, thereby dispensing with springs in connection with either axle; in the construction and arrangement of the several parts of the fifth-wheel, by means of which it is specially applicable to wagons which do not have springs in connection with their frames; in the construction and arrangement of the several parts of the hind wheels and their bearings, by means of which the usual axle is dispensed with; and in the combination and arrangement of its several operative parts, all constructed and operated as more fully hereinafter set forth.

The wagon which is the subject of the following description has a frame composed of side pieces A, a central cross-bar, B, a front cross-bar, B', all preferably of wood, and a rear yoke-bar, C, which should be of cast metal.

The front part of each side piece $a$ is cut away and diminished in size, so as to make it lighter, and the rear portion $b$ of the same has a longitudinal opening, $c$, from top to bottom, to give room for one of the hind wheels to turn in. This portion of the side piece A may be made of two pieces, properly separated by blocks, so as to leave the opening described between them.

The central cross-bar B is tenoned into or otherwise secured to the side pieces, as is also the front cross-bar, B', which is made broad enough to cover the top of the fifth-wheel, hereinafter to be described, and may be of width sufficient for a part of it to serve as a foot-board for the driver; or a separate foot-board, $d$, may be used.

The rear yoke-bar C, particularly shown in fig. 5, is cast with ribs, $e$, for the purpose of additional strength, and has openings, $e'$, which embrace the ends of the side pieces A and hold them firmly in position, and is itself held in place by bolts or other proper fastening.

The wagon-body D operates between the side pieces A with its front end when in position for carriage resting upon the cross-bar B', its central portion upon the spring-bar, hereinafter to be described, and its rear end extending to a point a little short of the yoke-bar C, so that in dumping no part of the body will touch said yoke-bar.

The body has a tail-board, $f$, in one piece, and ordinary stakes, $f'$, to hold the same in place; and upon its front lower center has a metallic plate, over the upper edge of which a latch-spring, E, secured within the front cross-bar B', engages, and serves to hold said body in a horizontal position.

A chain, $g$, attached to said latch-spring, is used to hold the spring back out of engagement, if need be, which is accomplished by passing one of its links over a pin, $g'$, in the front of the foot-board.

To the bottom or side rails of the wagon-body, and near the center of the same, lengthwise, are secured shackle-bolts E', which, in turn, are pivoted upon shackle-bolts E'', which pass vertically down through the spring-bar F, through a supporting-block, $h$, and through a stay-bar, F', below and against which their lower threaded ends are secured by nuts. The upper shackled ends of the bolts E'' fit into recesses in the spring-bar so as to give them a firmer position, and for the purpose of bringing the bottom of the wagon-body nearer to said spring-bar.

This spring-bar, which is preferably of wrought metal, extends at either end into a recess, G, cut out of the side pieces A, which recesses are protected by suitable metallic shells, h', and there rests upon India-rubber springs H.

A bolt, i, passes down through the side pieces A, and through said spring-bar, spring, and the stay-bar F', and is secured upon its lower threaded end by a suitable nut. This portion of the side pieces may be supported by proper metallic side, top, and bottom plates, j.

The stay-bar, made preferably of wrought metal, extends from side to side from the outsides of the side pieces A.

The supporting-block h, which should be of wood, is fitted closely between the spring-bar and the stay-bar, and prevents either from springing, and its ends, which come closely to the inner sides of the side pieces A, cover the recesses G and prevent the springs in part from spreading laterally, and also serve to prevent the intrusion of dust to said recesses.

The hind wheels I of the wagon, turning as before described in the openings c in the side pieces A, rotate upon fixed hollow spindles, J, in suitable outer and inner boxes, K and K'. These wheels are constructed with hubs, k, which do not extend longitudinally much beyond the tires or rims, and upon the inner side of each hub is a circular recess, k'.

The spindle J, preferably of cast metal, which is inserted into the hub from the inside as the wheel stands in position for use, is largest upon its inner end, and has around it a flange, l, corresponding in size and form with the recess k', into which it is closely fitted. When thus fitted the wheel I is midway between the two ends of said spindle.

On the side having the flange l, and midway between that and the end of the spindle, is another flange, m, encircling said spindle.

On the opposite or outside of the wheel the spindle is turned down considerably smaller, and upon this end, midway between the hub and the end of the spindle, is another flange, n, encircling said spindle. The spindle is held in place within said hub, and the hub secured thereto, by means of screws passing through the hub and through the flange l.

The box K is upon the outer under side of the side piece A, and is composed of upper and lower pieces, having central semicircular corresponding openings o in each, and also a vertical groove, o', running continuously entirely around the walls of said opening, of such a form and in such position as to receive the flange n, above named.

The box K', upon the inner under side of said side pieces A, is similarly constructed as the box K, and furnished with a like groove, o", for the reception of the flange m. Suitable openings in said boxes afford means for oiling. The boxes themselves are secured to the under sides of said side pieces A by means of suitable bolts passing down through said side pieces and the ends of said boxes, and properly threaded, and provided with nuts.

To the under side of the cross-bar B' is secured a block, L, provided with a dependent circular boss, p, having on its under side a recess, p'. This boss fits into a corresponding recess in the upper part M of the fifth-wheel, which is secured to the under side of the block L by means of suitable screws or bolts passing down through said cross-bar B', the block L, and the flanges q, upon said part M. This part just named is cast in one piece, of steel or malleable iron, and has a boss, r, with sidewalls r', nearly vertical, but slightly beveled inwardly, a bottom, r", a little convex, an internal cavity, s, corresponding to its external shape, and an opening, t, through the center of its bottom. This part M fits within and rotates in a lower part, N, of the fifth-wheel. This part N is a ring cast in one piece of suitable metal, having an internal circular opening, u, corresponding to the boss r, which fits within it, and a flange, v, encircling it, by means of which it is bolted or otherwise secured to the hound-block O. This hound-block, which is preferably of wood, has sunk into its center a circular recess, v', corresponding to the bottom r" of the part M, and in the center of this recess another circular recess, v", through the center of which is an opening, w, down through said hound-block and the fore axle P of the wagon.

A bolt, Q, passes down through the opening named in the part M, the hound-block O, and the axle P, and is secured upon its lower threaded end, beneath said axle, by a proper nut. This bolt has secured to it a disk, R, slightly concave upon its top, into which the bottom r" of the part M fits, and the disk in turn fits closely into the recess v" in the hound-block.

The opening t, before named, in the part M, is a little larger than the diameter of the bolt Q where it passes through it, for the purpose of allowing some play and rock to the fifth-wheel.

Upon said bolt, within the cavity s, is a washer, 1, and above that the bolt is threaded and provided with a nut, 2, not screwed down very tightly, so as to permit a little play vertically and laterally to the fifth-wheel.

The upper ends of the bolt, the nut, and the washer are covered by the boss p of the block L.

The tongue S is connected with the hound-block O, and the latter to the axle P, in a manner described in a former patent issued to me.

The fore wheels T complete the enumeration of parts belonging to this wagon.

In the construction of my device it will be noticed that nearly the entire weight of the load rests upon the spring-bar in the center, and this in turn upon the springs beneath its ends, by means of which contrivance I dispense with the steel springs at either end of the wagon, which are very heavy, very expensive, and continually liable to break; and at the same time I secure that elasticity which is indispensable in the proper carriage of bricks and fragile articles, and advantageous in the carriage of coals.

In connection with this arrangement for supporting and giving spring to the body of the wagon, my construction of frame allows it to be so dumped that the lower end of the body will rest upon the ground. This construction, however, requires me to dispense with the hind axle to my wagon, which I am able to do on account of the peculiar contrivances of the frame and the use of the metallic yoke-bar, which give it sufficient support.

Being thus obliged to run the hind wheels without an axle, I am enabled to do this by the use of the peculiar spindles and bosses employed, in which the hollow of the spindles enables me to combine strength with little weight, and to avoid all danger of heating, while the flanges on the spindles, turning in corresponding grooves in the boxes, tend to support the wheel and keep it always in proper vertical position.

By reason, however, of dispensing with springs to the forward part of my wagon, I am obliged to have such a fifth-wheel as may be safely operative, and so I use one which is exceedingly simple, strong, and cheap, which will bear the shocks imposed upon it and cannot readily get out of order.

I do not wish to be confined to dumping or other wagons, in the use of such parts of my device as are novel; but wish to employ them wherever they may be used beneficially.

Having thus described my invention, what I claim as new therein is—

1. In combination with the side pieces A of a wagon, the yoke-bar C, constructed and arranged substantially as described and shown.

2. The means employed for supporting and giving elasticity of motion to a wagon-body, consisting of the spring-bar F and India-rubber springs H, the spring-bar and springs being constructed, arranged, and operated substantially as described and shown.

3. The fifth-wheel M and N, constructed and arranged substantially as described and shown.

4. The hollow spindles J, provided with flanges $l$, $m$, and $n$, in conneccion with a wagon-hub, when said spindles are constructed and arranged substantially as described and shown.

5. The boxes K and K', in connection with the spindles J, substantially as described and shown.

6. The dumping-wagon described and shown as a complete whole, constructed, arranged, and operating substantially as set forth.

In testimony that I claim the foregoing I have hereunto set my hand this 22d day of April, 1871.

JACOB SKEEN.

Witnesses:
GEO. S. PRINDLE,
EDM. F. BROWN.